US012774041B2

(12) United States Patent
Erlacher et al.

(10) Patent No.: US 12,774,041 B2
(45) Date of Patent: Oct. 27, 2026

(54) MOTOR VEHICLE COMPONENT COMPRISING TWO PROFILES

(71) Applicant: MAGNA STEYR Fahrzeugtechnik Gmbh & Co KG, Graz (AT)

(72) Inventors: Manuel Erlacher, Radenthein (AT); Thomas Mokina, Seiersberg (AT); Olga Sulcová, Graz (AT)

(73) Assignee: MAGNA STEYR Fahrzeugtechnik GmbH & Co KG, Graz (AT)

(*) Notice: Subject to any disclaimer, the term of this patent is extended or adjusted under 35 U.S.C. 154(b) by 296 days.

(21) Appl. No.: 18/530,149

(22) Filed: Dec. 5, 2023

(65) Prior Publication Data

US 2024/0208589 A1 Jun. 27, 2024

(30) Foreign Application Priority Data

Dec. 22, 2022 (DE) ......................... 102022214326.4

(51) Int. Cl.
*B62D 27/02* (2006.01)
*B62D 25/02* (2006.01)

(52) U.S. Cl.
CPC ......... *B62D 27/023* (2013.01); *B62D 25/025* (2013.01)

(58) Field of Classification Search
CPC ............................ B62D 27/023; B62D 25/025
See application file for complete search history.

(56) References Cited

U.S. PATENT DOCUMENTS

| | | | | |
|---|---|---|---|---|
| 11,040,740 | B2 * | 6/2021 | Grottke | B62D 27/065 |
| 12,060,111 | B2 * | 8/2024 | Kim | B62D 27/023 |
| 12,454,316 | B2 * | 10/2025 | Jeon | B62D 25/025 |

FOREIGN PATENT DOCUMENTS

| | | | |
|---|---|---|---|
| CN | 1942306 | A | 4/2007 |
| CN | 111137360 | A | 5/2020 |
| CN | 210949428 | U | 7/2020 |
| CN | 114514162 | A | 5/2022 |
| DE | 19633911 | A1 | 2/1998 |
| DE | 102008057882 | A1 | 5/2010 |
| DE | 102018127368 | A1 | 5/2020 |
| DE | 102021004896 | A1 | 9/2022 |

OTHER PUBLICATIONS

European Patent Office search report for EP23205587.1 dated May 10, 2024.
German Search Report for application No. 10 2022 214 326.4; mailed on Jun. 22, 2023; 5 pages.
CNIPA Search Report for CN202311773575.2 dated Jul. 15, 2026.

* cited by examiner

*Primary Examiner* — Faye M Fleming
(74) *Attorney, Agent, or Firm* — Jordan IP Law, LLC; Todd A. Vaughn

(57) ABSTRACT

A motor vehicle component, in particular, a sill, and a method for producing such a motor vehicle component. The motor vehicle component includes a first profile having a first connecting surface; a second profile having a second connecting surface that is connected to the first connecting surface; and at least one connector member operable to form, at an end of the first connecting surface and at one end of the second connecting surface, an interlocking connection between the first profile and the second profile.

17 Claims, 4 Drawing Sheets

FIG. 1B

MOTOR VEHICLE COMPONENT COMPRISING TWO PROFILES

CROSS-REFERENCE TO RELATED APPLICATIONS

The present application claims priority 35 U.S.C. § 119 to German Patent Publication No. DE 102022214326.4 (filed on Dec. 22, 2022), which is hereby incorporated by reference in its complete entirety.

TECHNICAL FIELD

One or more embodiments of the present disclosure relates to a motor vehicle component such as a sill comprising a first profile and a second profile, and a method for producing such a motor vehicle component.

BACKGROUND

It is known that some motor vehicle components are composed of multiple, often long profiles. For example, the sills of a motor vehicle can be formed of two or more hollow profiles extending in the longitudinal direction of the motor vehicle. Such profiles can be connected together and joined over a large area at connecting surfaces, such as, for example, bonding surfaces. Such a motor vehicle component can be in particular a multi-part sill. The profiles can be manufactured via continuous production processes, such as, for example, extrusion. The profiles can be connected together at the longitudinal surfaces as connecting surfaces, for example by large-area adhesive bonding, riveting or welding. The motor vehicle component can thus be a sill composed of multiple extruded profiles.

In order to connect such profiles together, a large number of connecting points, such as punch rivets, resistance spot welding points, and/or large fastening surfaces, for example, for adhesive bonding, are required.

SUMMARY

One or more embodiments of the present disclosure provides a motor vehicle component such as a sill which comprises at least first profile and the second profile which are reliably joined to one another in a more simple and inexpensive manner.

One or more embodiments of the present disclosure provides a simple and inexpensive method for producing such a motor vehicle component.

In accordance with the one or more embodiments, a motor vehicle component such as a sill comprises one or more of the following: a first profile having a first connecting surface; and a second profile having a second connecting surface that is connected to the first connecting surface; at least one connector member operable to join, connect, or otherwise interlock the first profile and the second profile to one another at one end of the first connecting surface and one end of the second connecting surface.

In accordance with the one or more embodiments, the first profile and the second profile are joined to one another at a connecting surface. For this purpose, at least one connecting element such as an adhesive, which is preferably a separate element or component relative to the first profile and the second profile, is used to adhesively bond the two connecting surfaces together. The connector member can also be formed of the first profile and the second profile themselves, in particular, in the form of an interlocking connection (i.e., one profile is fitted or inserted into the other profile) of the first profile and the second profile to one another. In addition to the connector member for the connecting surfaces, a connecting system integrated in the components may be operable to join the first profile and the second profile. The connecting system is operable to join ends of the connecting surfaces of the first profile and the second profile to one another, namely by way of an interlocking connection of the ends of the connecting surfaces of the first profile and the second profile to one another. The interlocking connection is formed at an end of the connecting surface, i.e., at an edge of the connecting surface. In particular, the interlocking connection is preferably formed at exactly one end or one edge of the connecting surface, i.e., on one side. In another embodiment, the interlocking connection may be formed at two opposite ends or edges of the connecting surface, i.e., on two sides at the ends of the connecting surface.

Because the first profile and the second profile are connected together in an interlocking manner at one end of the connecting surface, the supplemental connection of the connecting surfaces can be reduced or simplified and the connector member can be saved, or the quality of the connection can be enhanced.

In accordance with the one or more embodiments, the end of the connecting surface at which the first profile and the second profile are connected together in an interlocking manner extends in a longitudinal direction, i.e., an x-direction of the first profile and the second profile. The first profile and the second profile are thus connected together in an interlocking manner over their length, preferably substantially over their entire length. The longitudinal direction of the first profile and the second profile preferably likewise lies, in the intended installation position in a motor vehicle, in the x-direction of the motor vehicle, i.e., in the longitudinal direction of the motor vehicle. The connecting surface and the interlocking connection can extend over at least 40%, preferably at least 60%, particularly preferably at least 80%, of the length of the profile and/or, in the installation position in a motor vehicle, of the length of the motor vehicle.

In accordance with the one or more embodiments, the first profile and the second profile are connected together in an interlocking manner at the end of the connecting surfaces by a rotatable or pivotable connection. The first profile and the second profile thus can engage into one another in a rotatable or pivotable manner. The interlocking connection forms a rotation or pivot axis. One or more adhesive layers, for example, as the connector member can thus be applied to the connecting surfaces in a more targeted manner and the quality of the adhesive bond can be enhanced.

In accordance with the one or more embodiments, the first profile and the second profile are connected together in an interlocking manner at the end of the connecting surface such that the first profile and the second profile are fixed at least in the region of the end of the connecting surface at least in the two transverse directions to the longitudinal direction of the first profile and the second profile, i.e., in the y-direction and the z-direction.

In accordance with the one or more embodiments, the first profile and the second profile are fastened to one another by the connector member or by a supplemental connector member at the end that is opposite the end of the connecting surface at which the first profile and the second profile are connected together in an interlocking manner. At this opposite end of the connecting surfaces, the connector member that serves to join the connecting surfaces can be used, or the supplemental connector member can be used at the connecting surface in addition to a connector member, for example screws, rivets or clamps in addition to an adhesive. The supplemental connector member can also be formed by an interlocking connection of the first profile and the second profile to one another, in particular, by a push-fit connection.

In accordance with the one or more embodiments, the connector member comprises an adhesive, and/or a mechanical fastener such as rivets, screws, or a weld connection.

In accordance with the one or more embodiments, the connecting surfaces have indentations, for example, grooves, so that the connecting surfaces are divided by the indentations into a plurality of smaller connecting surfaces. The indentations can preferably extend in the longitudinal direction of the first profile and the second profile.

In accordance with the one or more embodiments, a method for producing a motor vehicle component comprises one or more of the following: providing a first profile having a first connecting surface and a second profile having a first connecting surface separately from one another; connecting the first profile and the second profile together in an interlocking manner at one end of the first connecting surface and one end of the second connecting surface; and fastening, via a connector member, the first profile and the second profile to one another at the first connecting surface and the second connecting surface at least at an opposite end of the first connecting surface and one end of the second connecting surface.

In accordance with the one or more embodiments, a method for producing a motor vehicle component comprises one or more of the following: providing a first profile having a first connecting surface and a second profile having a first connecting surface separately from one another; connecting the first profile and the second profile together in an interlocking manner at one end of the first connecting surface and one end of the second connecting surface; and fastening, via a connector member and a supplemental connector member, the first profile and the second profile to one another at the first connecting surface and the second connecting surface at least at an opposite end of the first connecting surface and one end of the second connecting surface.

In accordance with the one or more embodiments, the first profile and the second profile are connected together in an interlocking manner (i.e., one profile is fitted or inserted into the other profile) at the end of the connecting surfaces. The first connecting surface and the second connecting surface are initially not oriented parallel to one another. The first profile and the second profile are then pivoted relative to one another so that the first connecting surface and the second connecting surface are oriented parallel to one another. At the same time, or thereafter, the first connecting surface and the second connecting surface are fastened to one another by connector member, at least at an opposite end of the interlocking connection.

DRAWINGS

One or more embodiments of the present disclosure will be illustrated by way of example in the drawings and explained in the description hereinbelow.

Figure 1B:
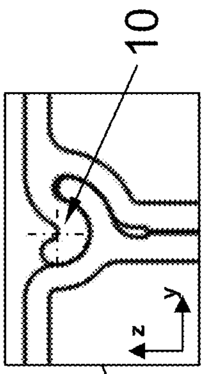
FIG. 1B illustrates a detailed representation of the detail marked in FIG. 1A (at the top) of the motor vehicle component of FIG. 1A.
Figure 1A:
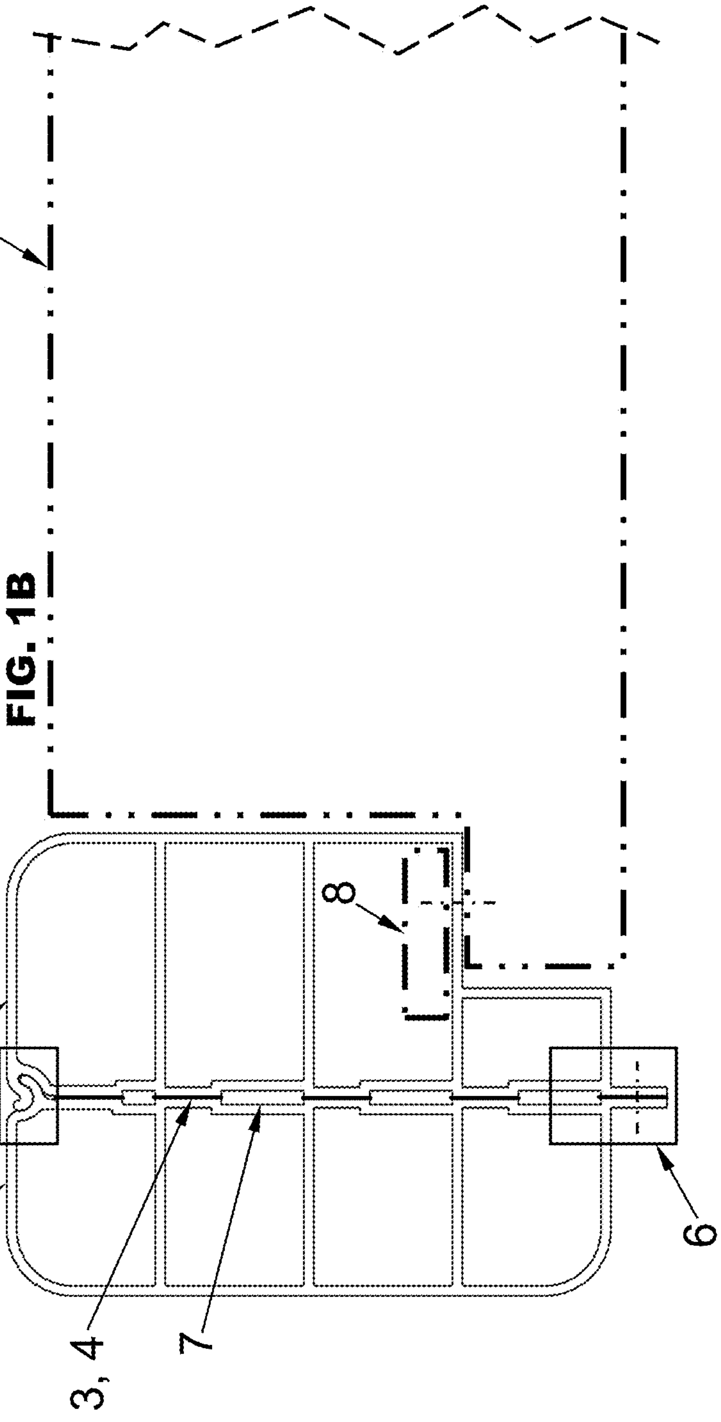
FIG. 1A illustrates a sectional view of a motor vehicle component with a drive battery fastened thereto, in accordance with one or more embodiments.

FIGS. 3A to 3F respectively illustrate a method in the production of the motor vehicle component of FIG. 1A.

Figure 4:
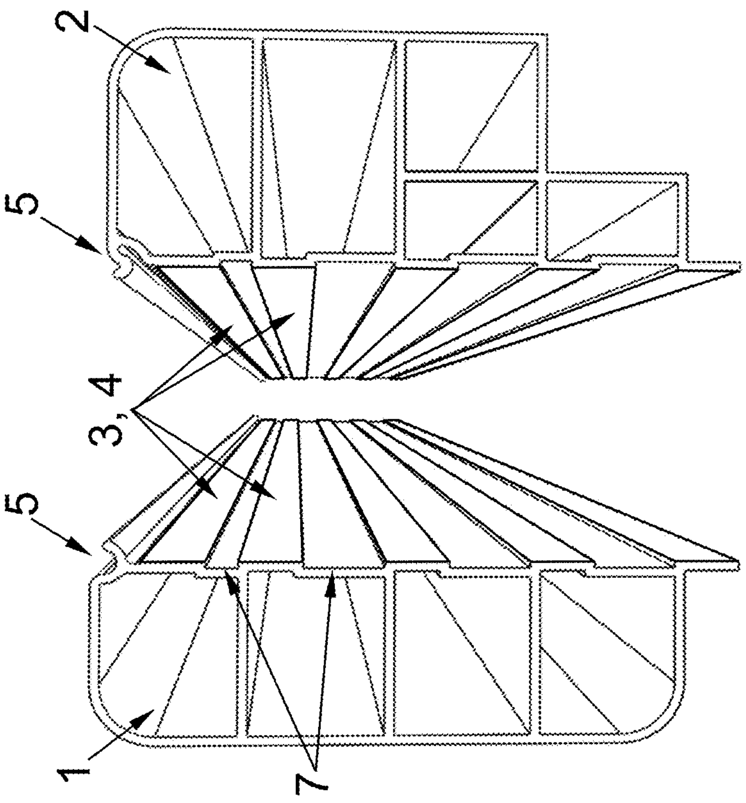

FIG. 4 illustrates a perspective view of the motor vehicle component of FIG. 1A.

DESCRIPTION

In accordance with one or more embodiments, FIG. 1A illustrates a motor vehicle component (e.g., a two-part sill) with a drive battery 9 fastened thereto by way of a fastening member 8. The motor vehicle component comprises a two-part sill that includes a first profile 1 and a second profile 2. The first profile 1 and the second profile 2 each have a connecting surface 3. The first profile and the second profile 1, 2 are joined to one another at their respective connecting surfaces 3 with the aid of at least one connector member 4, namely via one or more adhesive layers. The connecting surfaces 3 of one or both of the first profile 1 and the second profile 2 can have a plurality of indentations 7. Because of the indentations 7, each connecting surface 3 can be divided into a plurality of smaller or sub-connecting surfaces 3.

In accordance with one or more embodiments, the first profile 1 and the second profile 2 are connected together in an interlocking manner (i.e., one profile is fitted or inserted into the other profile) at one end 5 of the connecting surface 3. This end 5 of the connecting surface 3 is shown in detail in FIG. 1B. The first profile and the second profile each have arcuate projections at the ends 5 of the connecting surfaces 3, the arcuate projections lying one inside the other. An interlocking connection between the first profile 1 and the second profile 2 is thus achieved, which permits a pivoting movement of the first profile 1 and the second profile 2 about a pivot axis 10.

The end 5 of the connecting surface 3 at which the first profile 1 and the second profile 2 are connected together in an interlocking manner extends in a longitudinal direction, i.e., x-direction, of the first profile 1 and the second profile 2. The pivot axis 10 is oriented in this longitudinal direction of the first profile 1 and the second profile 2.

The first profile 1 and the second profile 2 are connected together in an interlocking manner at the end of the connecting surface 3 such that the first profile 1 and the second profile 2 are fixed in the region of the end 5 of the connecting surface 3 at least in the two transverse directions to the longitudinal direction of the first profile 1 and the second profile 2, i.e., in the y-direction and the z-direction (FIG. 1B).

Figure 1C:
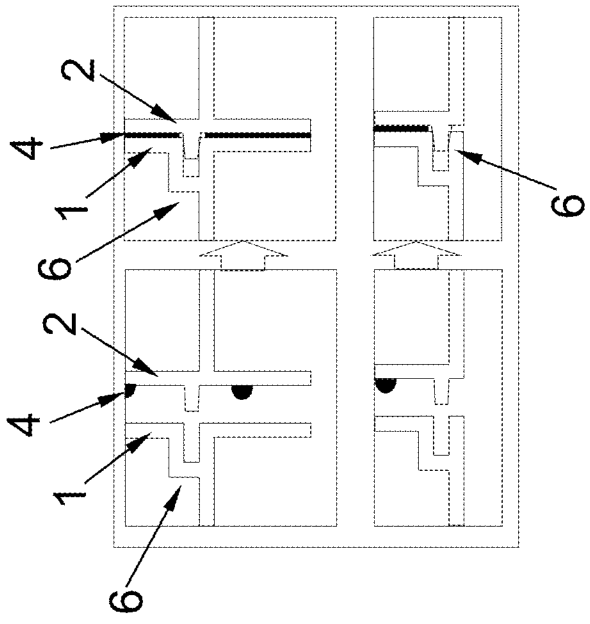
FIG. 1C illustrates a detailed representation of the detail marked in FIG. 1A in the region of the supplemental connector member (at the bottom) of the motor vehicle component of FIG. 1A.

At an opposite end to the end 5 of the connecting surface 3 at which the first profile 1 and the second profile 2 are connected together in an interlocking manner, the first profile 1 and the second profile 2 can be fastened to one another by a connector member 4 and/or by a supplemental connector member 6. Possible forms of a supplemental connector member 6 are illustrated in FIG. 1C, one embodiment in the two diagrams at the top and another embodiment in the two diagrams at the bottom. In those diagrams, the first profile 1 and the second profile 2 are each shown before joining (on the left) and after joining (on the right). The interlocking connection used here can use a flange that faces away from the connecting surface 3 (top) or can be configured without such a flange (bottom).

Figure 2:
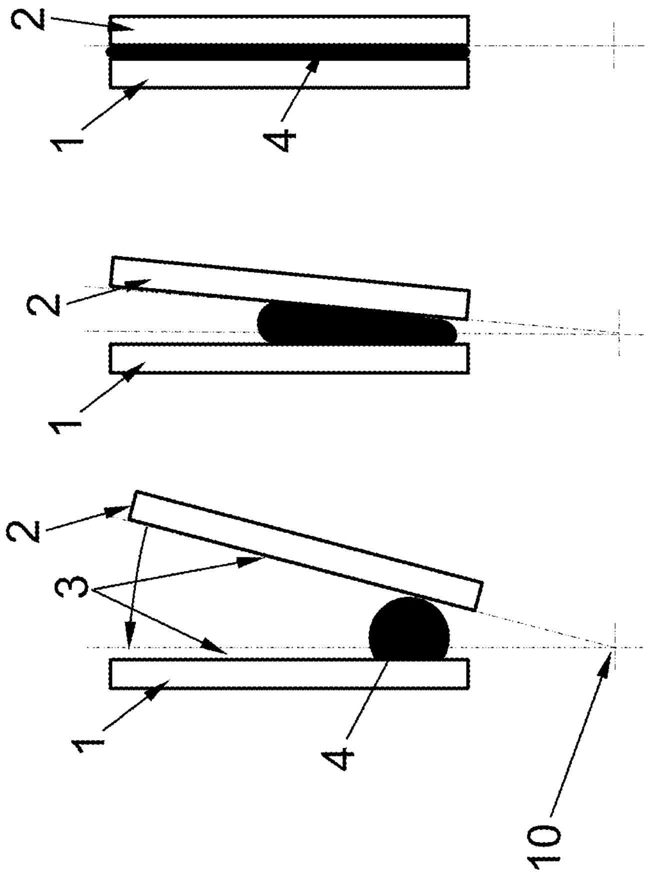
FIG. 2 illustrates a schematic representation of the process of joining a motor vehicle component, in accordance with one or more embodiments.

FIG. 2 is a schematic representation of a method (via three method steps from left to right) of joining a motor vehicle component in accordance with one or more embodiments. First, an adhesive bead as the connector member 4 is applied to a connecting surface 3 of at least one of the first profile 1 and the second profile 2. The two connecting surfaces 3, or the first profile 1 and the second profile 2, are then pivoted towards one another at a pivot axis 10, wherein the adhesive is readily able to spread between the connecting surfaces 3.

FIGS. 3A to 3F respective illustrate a method of producing the motor vehicle component (e.g., a two-part sill) of FIG. 1A.

Figure 3C:
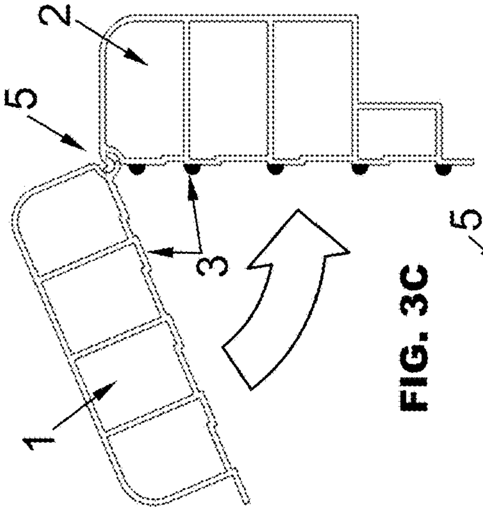
Figure 3F:
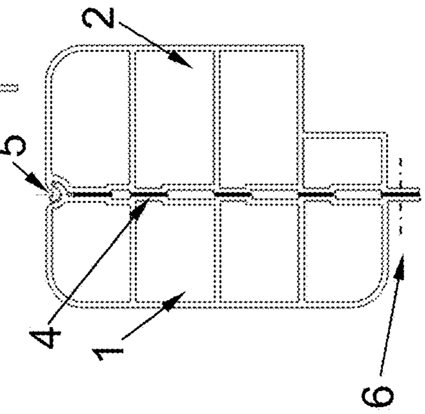
Figure 3B:
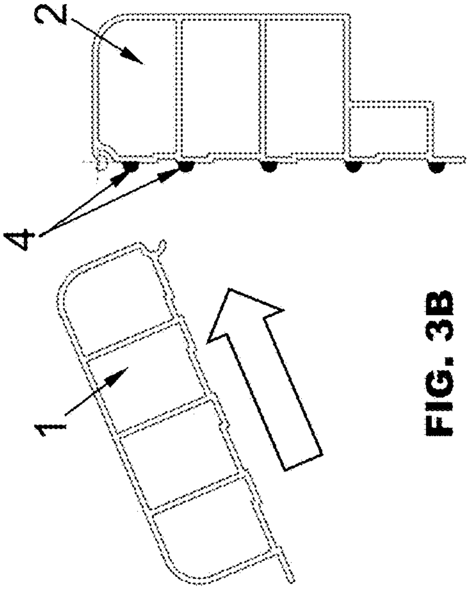
Figure 3E:
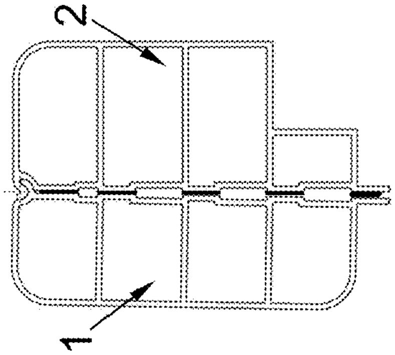
Figure 3A:
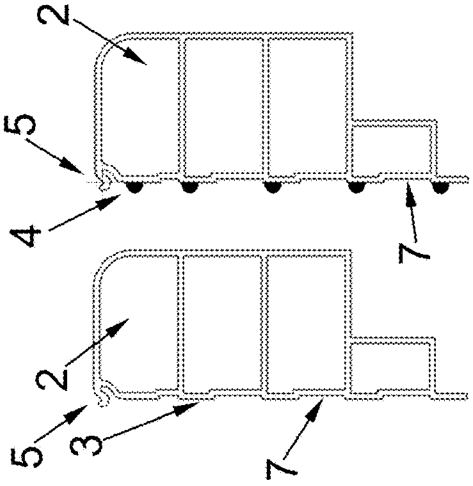

In FIG. 3A, only the second profile 2 is shown twice, namely on the left without applied adhesive beads and on the right with adhesive beads, which have been applied to the connecting surface 3 of the second profile 2, as the connector member 4.

In FIG. 3B, a first profile 1 is brought up to the second profile 2. In the region of the end 5 of the connecting surfaces 3, the first profile 1 and the second profile 2 are fitted into one another in an interlocking manner, wherein the remainder of the connecting surfaces 3 are still at a distance from one another.

As is illustrated in FIG. 3C, the first profile 1 and the second profile 2 are then pivoted about the pivot axis 10 (FIG. 1B) as they are being connected in an interlocking manner at the end 5 of the connecting surfaces 3, for example the first profile 1 is pivoted towards the second profile 2.

Figure 3D:
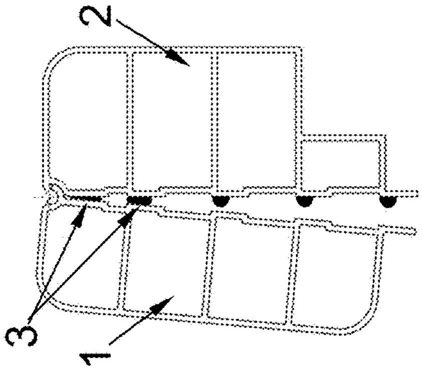

FIG. 3D illustrates how the adhesive beads increasingly spread over the connecting surfaces 3, starting at the end 5 at which the pivot axis is located (at the top in FIG. 3C), as a result of the two connecting surfaces 3 being brought closer together section by section. Spreading of the adhesive on the connecting surfaces 3 thus takes place in a particularly controlled manner.

In FIG. 3E, the connector member 4, the adhesive of all the adhesive beads, has spread over the connecting surfaces 3, in the regions in which there is no indentation 7.

Finally, FIG. 3F also illustrates that, in addition to the connection via the connector member 4 at the connecting surfaces 3, a connection can take place at the end of the connecting surfaces 3 that is opposite the end 5 via one or more supplemental connector member 6. This further connection can be made, for example, by clamping a flange between other components or by additional fastening elements or by an additional interlocking connection between the first profile 1 and the second profile 2. The supplemental connector member 6 can fix the first profile 1 and the second profile 2, for example, for the time taken for the adhesive to cure and/or permanently.

FIG. 4 shows a three-dimensional representation of such a two-part sill of FIG. 1A, in which the first profile 1 and the second profile 2 have not yet been joined to one another. Between the indentations 7 running horizontally in the longitudinal direction, defined bonding surfaces are created at the remaining connecting surfaces 3.

Via a component-integrated interlocking connection between the components in the region of the end 5 of the connecting surfaces 3, use of a connection member can be saved on one side, for example. In addition, during the joining process, a defined movement of the components towards one another can be achieved. For example, via a guided rotational movement or pivoting movement during joining, the bonding surfaces can be brought together over an increasingly smaller angle until they are parallel (FIGS. 3A to 3F). Well-defined, reproducible distribution of adhesive is thus obtained.

The terms “coupled,” “attached,” or “connected” may be used herein to refer to any type of relationship, direct or indirect, between the components in question, and may apply to electrical, mechanical, fluid, thermal, optical, electromagnetic, electromechanical, or other connections. In addition, the terms “first,” “second,” etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 first profile
2 second profile
3 connecting surface
4 connector member
5 end of the connecting surface
6 supplemental connector member
7 indentation
8 fastening mechanism
9 drive battery
10 pivot axis

What is claimed is:

1. A motor vehicle component, comprising:
a first profile having a first connecting surface with a plurality of indentations to divide the first connecting surface into a plurality of first sub-connecting surfaces;
a second profile having a second connecting surface with a plurality of indentations to divide the second connecting surface into a plurality of second sub-connecting surfaces; and
an interlocking connection between the first profile and the second profile which is formed by a rotatable connection that facilitates pivoting of the first profile and the second profile about a pivot axis; and
at least one connector member comprising an adhesive operable to form an adhesive connection between the first profile and the second profile.

2. The motor vehicle component of claim 1, wherein:
the interlocking connection is formed at a respective end of the first profile and the second profile;
the end of the first connecting surface extends in a longitudinal direction of the first profile, and
the end of the second connecting surface extends in a longitudinal direction of the second profile.

3. The motor vehicle component of claim 1, wherein the interlocking connection defines the pivot axis that facilitates the pivoting of the first profile and the second profile.

4. The motor vehicle component of claim 1, wherein:
the interlocking connection between the first profile and the second profile is such that the first profile is fixed at least in a region of the end of the first connecting surface at least in transverse directions to the longitudinal direction of the first profile, and
the interlocking connection between the first profile and the second profile is such that the second profile is fixed at least in a region of the end of the second connecting surface at least in transverse directions to the longitudinal direction of the second profile.

5. The motor vehicle component of claim 1, further comprising a supplemental connector member operable to fasten, at an opposite end of the interlocking connection, the first profile and the second profile.

6. The motor vehicle component of claim 1, wherein the motor vehicle component comprises a sill.

7. A method for producing a motor vehicle component, the method comprising:

providing a first profile having a first connecting surface and a second profile having a second connecting surface, the first connecting surface having a plurality of indentations to divide the first connecting surface into a plurality of first sub-connecting surfaces, the second connecting surface having a plurality of indentations to divide the second connecting surface into a plurality of second sub-connecting surfaces;

forming, via an adhesive at an end of the first connecting surface and at one end of the second connecting surface, an interlocking connection between the first profile and the second profile, the interlocking connection including a rotatable connection that facilitates a rotating of the first profile and the second profile about a pivot axis;

fastening, at an opposite end of the interlocking connection, the first profile and the second profile at the first connecting surface and the second connecting surface.

8. The method of claim 7, wherein:

the end of the first connecting surface extends in a longitudinal direction of the first profile, and the end of the second connecting surface extends in a longitudinal direction of the second profile.

9. The method of claim 7, wherein the interlocking connection defines the pivot axis that facilitates the pivoting of the first profile and the second profile.

10. The method of claim 7, wherein:

the interlocking connection between the first profile and the second profile is such that the first profile is fixed at least in a region of the end of the first connecting surface at least in transverse directions to the longitudinal direction of the first profile, and the interlocking connection between the first profile and the second profile is such that the second profile is fixed at least in a region of the end of the second connecting surface at least in transverse directions to the longitudinal direction of the second profile.

11. The method of claim 7, wherein the interlocking connection comprises a push-fit connection between the first profile and the second profile in which the first connecting surface and the second connecting surface are not oriented parallel to one another.

12. The method of claim 11, further comprising fastening, at an opposite end of the interlocking connection, the first profile and the second profile by pivoting the first profile and the second profile relative to one another so that the first connecting surface and the second connecting surface are oriented parallel to one another.

13. The method of claim 7, wherein the motor vehicle component comprises a sill.

14. A motor vehicle component, comprising:

a first profile having a first connecting surface with a plurality of indentations to divide the first connecting surface into a plurality of first sub-connecting surfaces;

a second profile having a second connecting surface with a plurality of indentations to divide the second connecting surface into a plurality of second sub-connecting surfaces;

an interlocking connection at an end the first profile and the second profile, the interlocking connection defining a pivot axis that facilitates pivoting of the first profile and the second profile about a pivot axis;

at least one connector member comprising an adhesive operable to form an adhesive connection between the first profile connecting surface and the second profile connecting surface that facilitates a pivoting or a rotating of the first profile and the second profile about a pivot axis; and a supplemental connector operable to form a mechanical connection between the first profile and the second profile at an opposite end of the interlocking connection.

15. The motor vehicle component of claim 14, wherein the interlocking connection is formed at a respective end of the first profile and the second profile.

16. The motor vehicle component of claim 14, wherein the interlocking connection is formed by arcuate projections at ends of the first profile and the second profile.

17. The motor vehicle component of claim 14, wherein the mechanical connection comprises a push-fit connection.

* * * * *